US012806646B2

(12) United States Patent
Steinborn et al.

(10) Patent No.: US 12,806,646 B2
(45) Date of Patent: Nov. 24, 2026

(54) DOSING DEVICE AND METHOD FOR DOSING THERAPEUTIC LIQUIDS

(71) Applicant: LTS Lohmann Therapie-Systeme AG, Andernach (DE)

(72) Inventors: Peter Steinborn, Neuwied (DE); Petra Botzem, Andernach (DE); Markus Bee, Bad Lippspringe (DE)

(73) Assignee: LTS Lohmann Therapie-Systeme AG, Andernach (DE)

( * ) Notice: Subject to any disclaimer, the term of this patent is extended or adjusted under 35 U.S.C. 154(b) by 447 days.

(21) Appl. No.: 18/013,404

(22) PCT Filed: Jun. 14, 2021

(86) PCT No.: PCT/EP2021/065972
§ 371 (c)(1),
(2) Date: Dec. 28, 2022

(87) PCT Pub. No.: WO2022/002572
PCT Pub. Date: Jan. 6, 2022

(65) Prior Publication Data

US 2023/0278057 A1 Sep. 7, 2023

(30) Foreign Application Priority Data

Jun. 29, 2020 (DE) ..................... 10 2020 117 012.2

(51) Int. Cl.
*B05B 13/04* (2006.01)
*B05C 5/02* (2006.01)

(52) U.S. Cl.
CPC .......... *B05B 13/0468* (2013.01); *B05C 5/025* (2013.01); *B05C 5/027* (2013.01)

(58) Field of Classification Search
USPC ......................... 118/321, 323, 300, 313–315
See application file for complete search history.

(56) References Cited

U.S. PATENT DOCUMENTS 5,098,024 A * 3/1992 MacIntyre ........... B25J 15/0019 901/29
5,298,023 A * 3/1994 Haber ................... A61M 5/322 604/211

(Continued)

FOREIGN PATENT DOCUMENTS

CN 105455747 A 4/2016
CN 105709962 A 6/2016

(Continued)

OTHER PUBLICATIONS

English Translation JP-2019523101-A (Year: 2019).*
English Translation WO-2018002254-A1 (Year: 2018).*
English Translation JP-2020049760-A (Year: 2020).*

*Primary Examiner* — Yewebdar T Tadesse
(74) *Attorney, Agent, or Firm* — The Webb Law Firm

(57) ABSTRACT

A metering device for metering therapeutic fluids onto a support element including a container for providing the therapeutic fluid. A fluid dispensing device, in particular including pumps, is connected to the container. A dispensing head for dispensing the therapeutic fluids to the support element is connected to the fluid dispensing device. A movement device for moving the metering head during the delivery of the therapeutic fluid is provided for equalizing the application of the therapeutic fluid to the support element. The disclosure also relates to a corresponding method.

7 Claims, 1 Drawing Sheet

(56) References Cited

U.S. PATENT DOCUMENTS

| | | | | |
|---|---|---|---|---|
| 5,421,517 | A | 6/1995 | Knudson et al. | |
| 5,890,656 | A | 4/1999 | Fuhlbrigge | |
| 6,187,322 | B1 * | 2/2001 | Hille | A61K 9/70 424/447 |
| 6,737,080 | B1 | 5/2004 | Schumann | |
| 2006/0102072 | A1 | 5/2006 | Inada et al. | |
| 2011/0262622 | A1 * | 10/2011 | Herre | B05C 5/027 118/712 |
| 2016/0121043 | A1 * | 5/2016 | Weibel | A61M 5/148 604/151 |
| 2019/0337001 | A1 * | 11/2019 | Fritz | B41J 3/4073 |

FOREIGN PATENT DOCUMENTS

| | | | | |
|---|---|---|---|---|
| CN | 107088161 | A | 8/2017 | |
| JP | 2000117153 | A | 4/2000 | |
| JP | 2003501294 | A | 1/2003 | |
| JP | 2012170889 | A | 9/2012 | |
| JP | 2019523101 | A * | 8/2019 | A61M 5/14248 |
| JP | 2020049760 | A * | 4/2020 | |
| WO | WO-2008069012 | A2 * | 6/2008 | A61M 15/025 |
| WO | 2012162073 | A1 | 11/2012 | |
| WO | WO-2018002254 | A1 * | 1/2018 | B01L 9/543 |
| WO | WO-2021102265 | A1 * | 5/2021 | A61C 9/0053 |

* cited by examiner

DOSING DEVICE AND METHOD FOR DOSING THERAPEUTIC LIQUIDS

CROSS-REFERENCE TO RELATED APPLICATIONS

This application is the United States national phase of International Application No. PCT/EP2021/065972 filed Jun. 14, 2021, and claims priority to German Patent Application No. 10 2020 117 012.2 filed Jun. 29, 2020, the disclosures of which are hereby incorporated by reference in their entirety.

BACKGROUND OF THE DISCLOSURE

Field of the Disclosure

The disclosure relates to a dosing device for dosing therapeutic liquids onto a support element. The disclosure further relates to a method for dosing therapeutic liquids onto a support element.

Description of Related Art

Transdermal therapeutic system (TTS) comprise a support element such as a thin absorbent matrix. In the know manufacturing methods of such therapeutic transdermal systems, the therapeutic liquid is applied to the matrix, in particular the absorbent matrix, by means of a tampon method. An absorbent matrix cannot be used to produce a transparent TTS. Dosing onto a matrix, in particular an adhesive matrix, by means of the tampon method results in a large dispersion in the amount of therapeutic liquid applied.

SUMMARY OF THE DISCLOSURE

It is an object of the present disclosure to provide a dosing device for dosing therapeutic liquids onto a support element, with which a low dispersion in the amount of therapeutic liquid supplied can be achieved. It is also an object of the disclosure to provide a corresponding method.

The object of the disclosure is achieved by a dosing device as described herein and a method as described herein.

The dosing device according to the disclosure for dosing therapeutic liquid onto a support element, such as a transparent matrix in particular, comprises a container for providing therapeutic liquid. A liquid dispensing device is fluidically connected to the container. The dispensing device, which particularly has one or several pumps, is fluidically connected to a dosing head. The dosing head is used to dispense the therapeutic liquid conveyed by the liquid dispensing device to or onto a top surface of the support element. According to the disclosure, a movement device is connected to the dosing head. The movement device can be used to move the dosing head while dispensing the therapeutic liquid. This realizes a distribution of the liquid during the dispensing of liquid. Thus, good results can be achieved for a TTS with, in particular, a uniform layer of a therapeutic liquid. In particular, this serves to ensure that the therapeutic agent can be dispensed well to the patient.

With the aid of the movement device provided according to the disclosure, in particular a pivoting movement or a rotating movement of the dosing head takes place. Here, a pivoting or rotating movement by 160° to 180° is preferred.

For further improvement of the dispersion of the therapeutic liquid onto the support element, it is preferred that the dosing head has at least two dosing units. In a further preferred embodiment, said at least two dosing units are arranged opposite to each other, in particular opposite to the pivot axis. If now the dosing head and thus the at least two dosing units are pivoted or rotated, respectively, by 160° to 180°, the therapeutic liquid is applied to the support element in an almost complete circle. When providing two dosing units opposite to each other and pivoting them by at least 180°, a complete circle of therapeutic liquid is created on the support element. This results in a very uniform application of the therapeutic liquid on the support element.

Optionally, more than two dosing units may be provided. Here, it is preferred that the pivot or rotation angle is adapted to the number of dosing units. If, for example, four dosing units are provided, that are preferably arranged offset by 90°, the dosing head carrying the dosing units is rotated or pivoted by about 80° to 90°. As a result, a substantially complete circle of therapeutic liquid is again created on the support element.

In a further preferred embodiment, each dosing unit has at least two dosing nozzles. In this respect, two part-circular paths of therapeutic liquid are created on the support element. As a result, it is preferred that two substantially complete rings of therapeutic liquid are created on the support element. This can also further improve the uniform dispensing of therapeutic liquid.

After a completed dosing process, the dispensing of therapeutic liquid is stopped, in particular by no more liquid being dispensed by the liquid dispensing device, which preferably has rotary piston pumps or wobble piston pumps. In particular, the dosing nozzles may also be provided with valves to prevent an overrun of therapeutic liquid. An overrun of the liquid could cause therapeutic material to be carried off between two adjacent support elements upon the relative movement of the dosing head and the support elements, resulting in no clean edges. This would be disadvantageous in that no active ingredient should be present in the outer edge region of a TTS, since the support element is closed with a cover element and a fixed connection between the support element and the cover element must be ensured in a circumferential edge region so that no therapeutic liquid can escape in this region, for example during transport. Also, the liquid dispensing device could cause the therapeutic liquid to be withdrawn or conveyed back so that it is drawn back into the dosing nozzles. This can prevent dripping or running over.

In a particularly preferred embodiment of the dosing device according to the disclosure, the dosing head is connected to a lifting device. By providing such a lifting device, it is possible to lift the dosing head after the therapeutic liquid has been dispensed. This means that when the dispensing of liquid is interrupted, the risk of an overrun is reduced. In particular, by providing a lifting device, it is possible to provide dosing nozzles without valves. Lifting the dosing head after dispensing and lowering the dosing head again for the next dispensing is sufficient to prevent liquid from being carried off from one TTS to the next TTS.

It is preferred that the lifting device, which effects both lifting and lowering of the dosing head, is pneumatically operated. The movement device for pivoting or rotating the dosing head can be operated electrically or also pneumatically.

Furthermore, the disclosure relates to a device for manufacturing therapeutic transdermal systems (TTS). Said device comprises a feeding device, such as a conveyor belt. The feeding device is used to feed a support element. The support element can be a continuous material that is later cut, for example. Moreover, the device comprises a dosing device as described above. The dosing device is used for dosing therapeutic liquid onto the support element. In particular, the liquid is dosed at regular intervals onto a continuous support element so that corresponding products can then be manufactured by cutting or punching. In addition, the device comprises at least one feeding device for at least one cover element. Here, the cover element is preferably fed after the therapeutic liquid has been applied by the dosing device, so that the support element is covered. As a result, the therapeutic liquid is disposed between the support element and the cover element. When using continuous material, a cutting and punching device may be provided for manufacturing the corresponding products by cutting or punching.

Furthermore, the disclosure also relates to a method for dosing a therapeutic liquid onto a support element. In particular, the method according to the disclosure is carried out by means of the dosing device according to the disclosure and in particular the device for manufacturing therapeutic transdermal systems as described above.

According to the method according to the disclosure, a therapeutic liquid is dosed by means of a dispensing device onto a support element. Here, according to the disclosure, a dosing head fluidically connected to the dispensing device is moved during the dosing of the therapeutic liquid in order to realize an application of the therapeutic liquid onto the support element as uniform as possible.

In addition to or instead of moving the dosing head, the support element can also be moved accordingly.

Preferably, the dosing head is pivoted or rotated, wherein it is particularly preferred that the dosing head is rotated by 160° to 180° during the dispensing of liquid.

After dosing, the dosing head is moved back to an initial position and, in particular, pivoted back or rotated back. It is also preferred that the dosing head is lifted after dosing or at the end of the dosing process, respectively. Before dosing, the dosing head is lowered again.

Advantageous further developments of the method according to the disclosure are also described above by means of the dosing device and the device for manufacturing therapeutic transdermal systems.

BRIEF DESCRIPTION OF THE DRAWINGS

In the following, the disclosure is described in more detail by means of a preferred embodiment with reference to the accompanying drawings.

In the drawings.

DESCRIPTION OF THE DISCLOSURE

Figure 1:
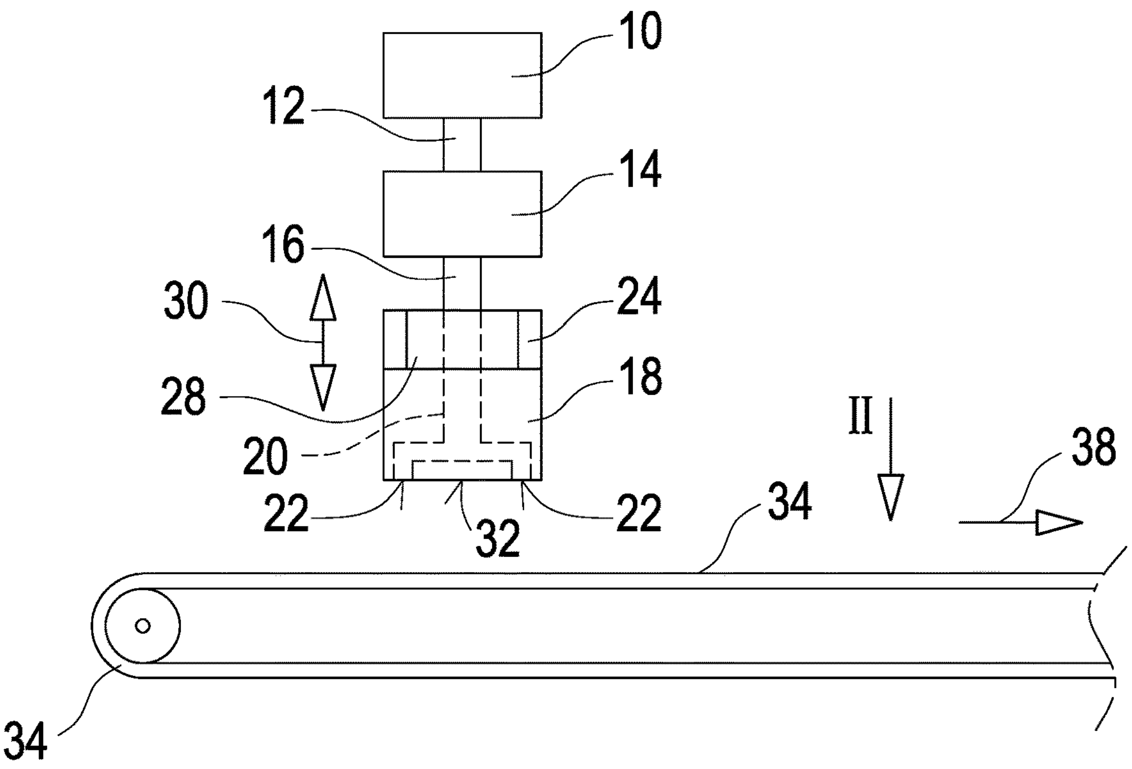
FIG. 1 is a greatly simplified schematic side view of a dosing device.

In a greatly simplified embodiment, the dosing device comprises a container 10 in which the therapeutic liquid is stored. Container 10 is fluidically connected to a liquid dispensing device 14 via a line 12. Here, liquid dispensing device 14 particularly comprises pumps, preferably rotary piston pumps or wobble piston pumps. The liquid dispensing device 14 is connected to the dosing head 18 via a line 16. The lines 20 leading to the nozzles 22 are arranged within dosing head 18.

In the illustrated exemplary embodiment, respectively two nozzles 22 form a dosing unit 21.

Moreover, dosing head 18 is connected to a movement device 24. Movement device 24 allows it to rotate or pivot dosing head 18 about a central axis 26.

In addition, a lifting device 28 is connected to dosing head 18. Lifting device 28 can be used to lift or lower the dosing head in the direction of an arrow 30.

A bottom side 32 of dosing head 18 is transported from left to right by means of a feeding device 39 in FIG. 1.

For manufacturing corresponding products, the therapeutic liquid is fed in a dosing process, wherein dosing head 18 in the illustrated embodiment is pivoted by 180° about axis 26 (arrow 36) during the feeding process. Here, the therapeutic liquid of the illustrated exemplary embodiment is dispensed through four nozzles 22. After the dosing process, the dosing head is lifted by means of lifting device 28 (arrow 30). Then, support element 34 is moved in the Figures to the right (arrow 38) in preparation for the next dosing process. Dosing head 18 can then be lowered again and the next dosing process can be started.

Figure 2:
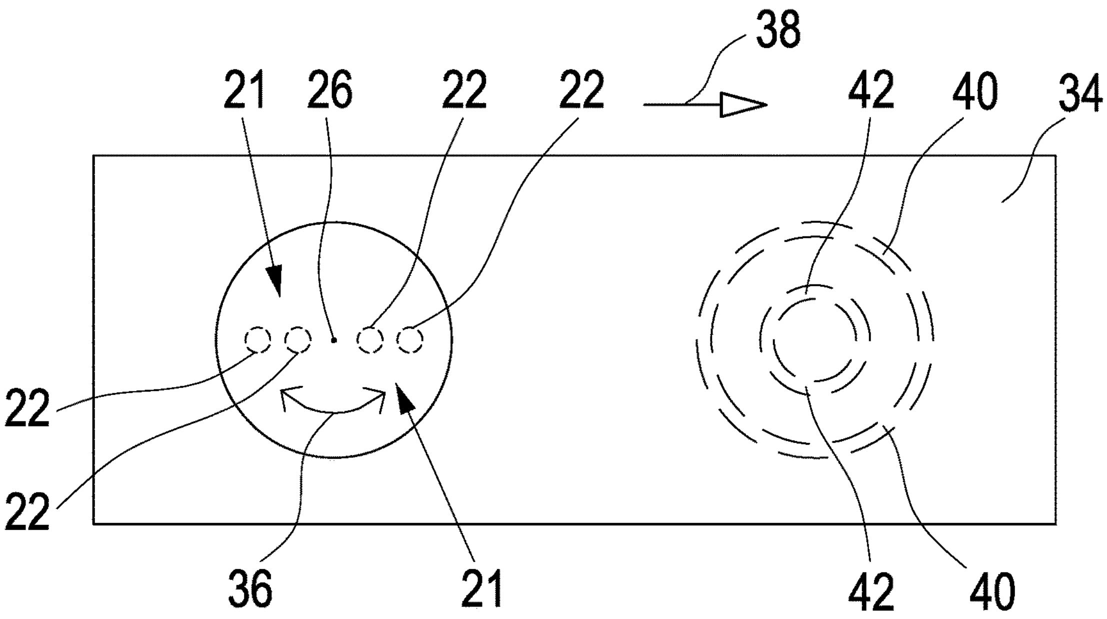
FIG. 2 is a plan view on a support element in the direction of arrow II in FIG. 1.

FIG. 2 also shows schematically on the upper side of support element 34 the dosing that respectively has taken place in semicircles 40, 42.

In the next step, a cover element, which is not illustrated, is then fed by a feeding device, which is also not illustrated. The cover element is arranged such that the therapeutic liquid is disposed between the support element 34 and the cover element. In this way, a cutting or punching device can be used to produce products that are particularly round in the illustrated exemplary embodiment.

The invention claimed is:

1. A dosing device for manufacturing a therapeutic transdermal system (TTS) for dosing therapeutic liquids onto a support element of the therapeutic transdermal system (TTS) comprising:
- a container in which a therapeutic liquid is stored;
- a liquid dispensing device comprising a rotary piston pump or wobble piston pump fluidically connected to the container;
- a dosing head fluidically connected to the liquid dispensing device for dispensing the therapeutic liquid conveyed by the liquid dispensing device to the support element of the therapeutic transdermal system (TTS); and
- a movement device connected to the dosing head for moving the dosing head at least during the delivery of the therapeutic liquid to the support element of the therapeutic transdermal system (TTS),
- wherein the movement device effects a pivoting movement and/or a rotating movement of the dosing head by 160° to 180°.

2. The dosing device according to claim 1, wherein the dosing head has at least two dosing units.

3. The dosing device according to claim 2, wherein at least two dosing units are arranged opposite to each other with respect to a pivot axis.

4. The dosing device according to claim 2, wherein the dosing units have at least two dosing nozzles.

5. The dosing device according to claim 1, wherein the dosing head is connected to a lifting device.

6. The dosing device according to claim 1, wherein the liquid dispensing device has several rotary piston pumps and/or wobble piston pumps.

7. A dosing device for manufacturing a therapeutic transdermal system (TTS) for dosing therapeutic liquids onto a support element of the therapeutic transdermal system (TTS) comprising:
- a container in which a therapeutic liquid is stored;

a liquid dispensing device comprising a rotary piston pump or wobble piston pump fluidically connected to the container;

a dosing head fluidically connected to the liquid dispensing device for dispensing the therapeutic liquid conveyed by the liquid dispensing device to the support element of the therapeutic transdermal system (TTS); and a movement device connected to the dosing head for moving the dosing head at least during the delivery of the therapeutic liquid to the support element of the therapeutic transdermal system (TTS), wherein the movement device has a pneumatic pivot drive.

* * * * *